(12) United States Patent
Studnicka

(10) Patent No.: US 10,275,744 B2
(45) Date of Patent: Apr. 30, 2019

(54) ENHANCED DATA TRANSFER INITIATION USING IMAGE RECOGNITION

(71) Applicant: PAYPAL, INC., San Jose, CA (US)

(72) Inventor: Todd Murray Studnicka, Omaha, NE (US)

(73) Assignee: PAYPAL, INC., San Jose, CA (US)

( * ) Notice: Subject to any disclaimer, the term of this patent is extended or adjusted under 35 U.S.C. 154(b) by 120 days.

(21) Appl. No.: 15/040,715

(22) Filed: Feb. 10, 2016

(65) Prior Publication Data

US 2017/0228584 A1   Aug. 10, 2017

(51) Int. Cl.

| | | |
|---|---|---|
| G06K 9/62 | (2006.01) | |
| G06Q 20/10 | (2012.01) | |
| G06F 3/0481 | (2013.01) | |
| G06F 3/0488 | (2013.01) | |
| H04W 76/14 | (2018.01) | |
| H04L 29/12 | (2006.01) | |
| G06K 9/00 | (2006.01) | |

(52) U.S. Cl.
CPC ......... G06Q 20/10 (2013.01); G06F 3/04812 (2013.01); G06F 3/04883 (2013.01); H04W 76/14 (2018.02); G06F 2203/04808 (2013.01); G06K 9/00288 (2013.01); G06K 9/00389 (2013.01); H04L 61/1594 (2013.01)

(58) Field of Classification Search
CPC .... G06Q 20/10–20/108; G06Q 20/223; G06Q 20/3223; G06Q 20/40145; G06K 9/00288–9/00295
See application file for complete search history.

(56) References Cited

U.S. PATENT DOCUMENTS

| | | | |
|---|---|---|---|
| 2011/0231310 A1* | 9/2011 | Roberts | G06F 21/316 705/40 |
| 2012/0158589 A1* | 6/2012 | Katzin | G06Q 20/12 705/44 |
| 2012/0243750 A1* | 9/2012 | De Vos | G06K 9/00221 382/118 |
| 2013/0218757 A1* | 8/2013 | Ramanathan | G06Q 20/385 705/39 |
| 2014/0089195 A1* | 3/2014 | Ward | G06Q 20/223 705/44 |
| 2017/0124540 A1* | 5/2017 | Chan | G06Q 20/102 |

* cited by examiner

*Primary Examiner* — Brian Werner
(74) *Attorney, Agent, or Firm* — Haynes and Boone, LLP

(57) ABSTRACT

Systems, methods, and computer program products are disclosed for improving ease in initiating information transfers between devices. A user of a communications device accesses an image of a target recipient. With that recipient in view in the image, the user selects the portion of the screen where the recipient is displayed in the image. Pattern recognition is performed to extract one or more features of the selected portion of the screen as a recognized pattern. That recognized pattern is compared against multiple stored patterns that are associated with contacts in contact lists and/or other types of databases. Once a match is found, the user is prompted to confirm the identified recipient corresponding to the matching pattern and the data to transfer. Once confirmed, the data transfer is initiated based on the automatically determined recipient information.

19 Claims, 9 Drawing Sheets

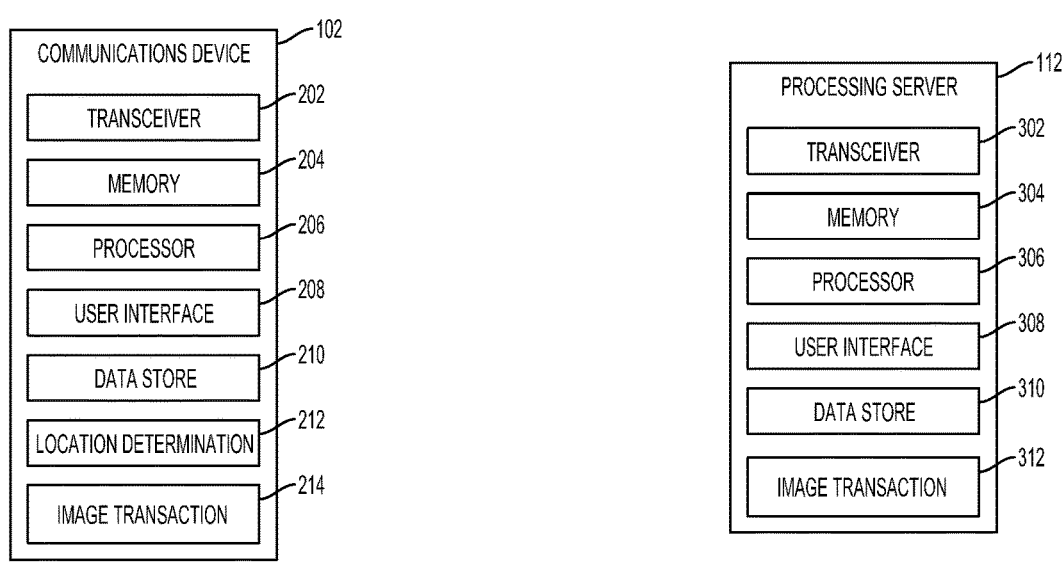

US 10,275,744 B2

ENHANCED DATA TRANSFER INITIATION USING IMAGE RECOGNITION

TECHNICAL FIELD

The present disclosure generally relates to electronic communications between computing devices, and more particularly to the initiation of data transfer of different types of information to other computing devices based on image pattern recognition.

BACKGROUND

Transferring information between devices typically involves entering an address for the targeted recipient, e.g., an address that some device associated with the target recipient is able to access, or by locating the address in a contact list, followed by entering in details of the information that is sought to be sent. Further, the information may be sought to be sent to one or more targeted recipients within a close proximity to the transferor. Entering in (or looking up) the address for the one (or more targeted recipients) can be cumbersome and subject to more opportunities for error such as in manual address entry.

Thus, there is a need for techniques to improve the ability for multiple communications or computing devices to determine targeted recipient addresses and initiate/complete the transfer of information with greater ease.

BRIEF DESCRIPTION OF THE DRAWINGS

FIG. 2 is a block diagram of an exemplary mobile communications device according to embodiments of the present disclosure.

FIG. 3 is a block diagram of an exemplary server device according to embodiments of the present disclosure.

Figure 1:
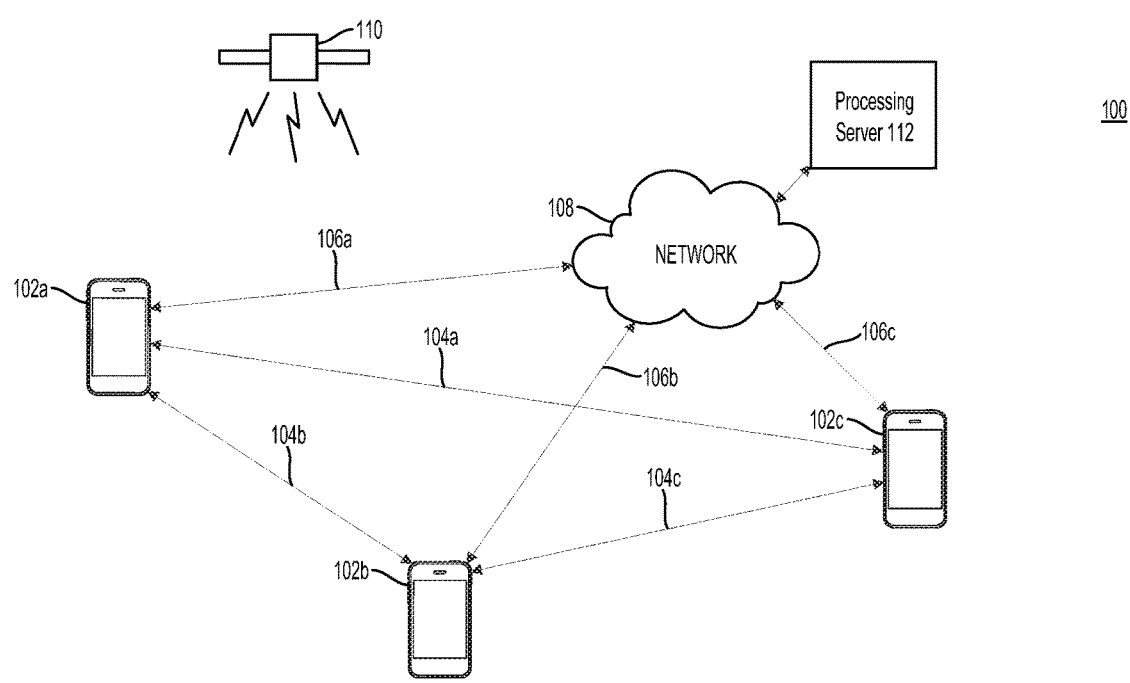
FIG. 1 is a diagram of an exemplary communications environment according to embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The present disclosure provides systems, methods, and computer program products for improving the ease with which information transfer is initiated between recipients and their devices. According to embodiments of the present disclosure, an image displayed on a screen may be selected as a way to obtain contact information for the entity represented by the image.

When a user of a mobile communications device desires to transfer data to another entity, such as a person, the user may access an image of that person (e.g., via a live feed, video, or static picture). For example, if the person is near the user, the user may point an image capturing device toward that person. With that person in view in the image, the user may select the portion of the screen where the person is displayed in the image. In response, pattern recognition is performed to extract one or more features of the person as a recognized pattern. That recognized pattern is compared against multiple stored patterns that are associated with contacts in contact lists and/or other types of databases (e.g., transactional databases).

Once a match is found, the user may be prompted to confirm the identified recipient that corresponds to the matching pattern. The user may also be prompted to confirm or modify the data to be transferred, for example if it was a default set of data to begin with. Once the data to be transferred is confirmed, the data transfer is initiated based on the automatically determined recipient information.

Referring now to FIG. 1, an embodiment of an exemplary communications environment 100 is illustrated. The communications environment 100 may include a number of mobile communications devices 102, one or more networks 108, a global navigation satellite system (GNSS) 110, and a processing server 112. The communications environment 100 illustrated in FIG. 1 is simplified for sake of illustration.

The communications environment 100 may support operation on multiple carriers (e.g., waveform signals of different frequencies for wireless communications, or wired communications). As an example, the communications environment 100 may be a multi-carrier LTE network capable of efficiently allocating network resources. The communications environment 100 is one example of a network to which various aspects of the disclosure apply.

The communications environment 100 includes one or more mobile computing or communications devices 102

(referred to herein simply as mobile communications devices), illustrated in FIG. 1 as mobile communications devices 102a, 102b, and 102c. The mobile communications devices 102a, 102b, and 102c may be, for example, User Equipment (UEs). The mobile communications devices 102a, 102b, and 102c may each also be referred to as a terminal, a mobile station, a subscriber unit, etc. A mobile communications device 102 may be a cellular phone, a smartphone, a personal digital assistant, a wireless modem, a laptop computer, a tablet computer, a tag (e.g., RFID tag), etc., to name just a few examples. The mobile communications devices 102a, 102b, and 102c may be location-aware, for example by including circuitry and/or software to enable the mobile communications devices 102a, 102b, and 102c to determine their own locations.

For example, one or more of the mobile communications devices 102a, 102b, and 102c may include circuitry and/or software that enable them to be in communication with the GNSS 110 in order to determine location. The GNSS 110 may be, for example, the Global Positioning System (GPS), Galileo, GLONASS, BeiDou, or some other such system that enables the mobile communications devices 102a, 102b, and 102c to determine geolocation information from signals provided by individual satellites of the GNSS 110. The circuitry and/or software of mobile communications devices 102a, 102b, and 102c may additionally or alternatively enable location determination based on other parameters, such as base station triangulation, time of flight measurements, etc.

The mobile communications devices 102a, 102b, and 102c may communicate with each other (as well as other devices) via one or more connections. One or more of the mobile communications devices 102a, 102b, and 102c may establish connections to each other via the network 108. For example, the mobile communications device 102a may establish the connection 106a with the network 108, the mobile communications devices 102b may establish the connection 106b with the network 108, and the mobile communications device 102c may establish the connection 106c with the network 108. For example, the mobile communications device 102a may communicate with mobile communications device 102b, via the network 108, by way of the connections 106a and 106b (e.g., the connection 106a constitutes an uplink to the network 108 and the connection 106b a downlink from the network 108). Similarly, the mobile communications device 102 may communicate with mobile communications device 102c, via the network 108, by way of connections 106a and 106c. Similar examples apply with respect to the other mobile communications devices 102b and 102c.

The network 108 may be, for example, a core network, an access network, other network, and/or any combination of networks. The network 108 may include one or more base stations. For example, one or more the base stations may include an evolved Node B (eNodeB). A base station may also be referred to as a base transceiver station or an access point. There could be one to many base stations, as well as be an assortment of different types such as macro, pico, and/or femto base stations. The base stations may also communicate with one another directly or indirectly, such as via network 108. The network 108 may be an LTE network or a WiFi network, to name just a few examples. The mobile communications devices 102 may use the network 108 to convey the data communications between them and the processing server 112 according to embodiments of the present disclosure. The mobile communications devices 102 may use one or more elements of the network 108 to discover each other, while in other embodiments the mobile communications devices 102 may discover each other through near field communications (NFC) or Bluetooth ad-hoc connections for initial session negotiation and continue communication via NFC or Bluetooth, or alternatively via network 108.

In addition or alternatively, the mobile communications devices 102 may be capable of establishing peer-to-peer (P2P) sessions with one or more other devices, such as mobile communications device 102a establishing a P2P session 104a/104b with one or both of the mobile communications devices 102b and 102c. Similarly, the mobile communications device 102b may be capable of establishing a P2P session 104b/104c with one or both of the mobile communications devices 102a and 102c. Similarly, the mobile communications device 102c may be capable of establishing a P2P session 104a/104c with one or both of the mobile communications devices 102a and 102b.

For example, the mobile communications devices 102a, 102b, and 102c may be capable of (e.g., includes one or more associated transceivers for) linking to each other via device-to-device (D2D) links, such that the P2P sessions 104 may constitute D2D links. As another example, the mobile communications devices 102a, 102b, and 102c may be capable of (e.g., includes one or more associated transceivers for) connecting via Bluetooth or NFC with each other, to name just a few examples. The mobile communications devices 102a, 102b, and 102c may all establish the same types of P2P sessions 104 with each other (e.g., all using the same linking technology/protocols), or alternatively may use a variety of technologies/protocols in order to establish the P2P sessions 104 in the communications environment 100.

The processing server 112 may provide one or more services to the mobile communications devices 102 as well as other devices and entities. In an embodiment, the processing server 112 may be a payment processing server that may process one or more transactions on behalf of one or more clients, such as one or more users of one or more of the mobile communications devices 102. For example, the processing server 112 may facilitate processing of only payment transactions and/or online invoice transactions between multiple parties. The processing server 112 may further include one or more interfaces to external payment processing facilities to further process payments. Although illustrated as one server, it will be recognized that processing server 112 may be a standalone system or multiple systems operating in cooperation.

According to embodiments of the present disclosure, a user of a mobile communications device 102 may initiate and complete a transfer of data to one or more other mobile communications devices 102 using one or more images to facilitate selection of contact information for the transfer. Mobile communications device 102a will be used herein as a specific example for purposes of discussion. According to embodiments of the present disclosure, a user of the mobile communications device 102a may access an image that contains one or more entities within it. For example, the user may access a picture or video stored on the mobile communications device 102a, such as in an image gallery, or that is stored on some external device and accessible e.g. via the network 108 (such as the Internet, and one or more servers hosting one or more social networking sites). The one or more entities may include one or more persons, one or more logos, text (e.g., a textual graphic), and/or some combination of the above to name just a few examples.

Upon accessing the image on the mobile communications device 102a, the user may select one or more portions of the image according to the embodiments discussed in more detail below. Selection of the one or more portions may trigger a pattern recognition algorithm to begin. This could include performing pattern recognition at the mobile communications device 102a, or sending at least the selected portion of the image (e.g., picture or frame from a video) to another device, such as the processing server 112 via the network 108, to perform the pattern recognition on at least the selected portion of the image.

Once a pattern has been obtained from the image, that pattern is compared against other available patterns that correspond to potential contacts. For example, in embodiments where the pattern recognition is performed at the mobile communications device 102a, the mobile communications device 102a may further compare the recognized pattern against some subset of stored patterns (or all stored patterns). Each stored pattern may correspond to a different contact, e.g. the different contacts maintained in a contacts list in the mobile communications device 102a (the stored patterns may correspond to text or images, such as a profile image stored for a given contact in the contact list, in which case the mobile communications device 102a may have previously performed pattern recognition on the profile image upon contact setup or may have received the pattern for the profile image from an external source, such as processing server 112).

In an alternative embodiment, the mobile communications device 102a may send the recognized pattern to the processing server 112 for the processing server 112 to compare against stored patterns at the processing server 112 and/or other servers/entities. Further, the mobile communications device 102a may first attempt to locate a matching stored pattern locally, and if no match is found, send the recognized pattern to the processing server 112 for further searching and comparison.

Either way, once a matching pattern is found from among one or more stored (or dynamically accessed via one or more networks 108 from some other database(s)), contact information associated with the matching pattern is accessed to identify a recipient address for the transfer of data. Where the processing server 112 searched among stored patterns, this may be performed by the processing server 112, after which the accessed contact information is sent to the mobile communications device 102a via the network 108. Upon receipt of the contact information, or upon accessing the contact information stored locally where the mobile communications device 102a performed its own search, the mobile communications device 102a may initiate transfer of the data to the recipient identified from the image, thereby reducing the chance of error of a user entering an incorrect contact address and improving the ease, convenience, and efficiency of identifying recipients and transferring data according to embodiments of the present disclosure. For example, in an embodiment the transfer of data may correspond to transferring a monetary amount in payment or an invoice for an amount to the identified recipient.

In an embodiment, transfer of the data to the address of the recipient (e.g., which may be received at one or more devices of the recipient such as one of mobile communications devices 102b and 102c, or another computer) may occur by the mobile communications device 102a instructing the processing server 112 via connection 106a to transfer data (e.g., of which at least a subset was also provided from the originating mobile communications device 102a) to an address of the recipient, which may in practice translate into the processing server 112 sending the data to the mobile communications device 102c via connection 106c (e.g., where the mobile communications device 102c is associated with the address such as an email address or phone number, to name some examples).

In an alternative embodiment, the transfer may occur by the mobile communications device 102a utilizing a P2P session with a device associated with the recipient, in this example mobile communications device 102c via P2P session 104a. Where the data is money or an invoice that is managed by the processing server 112, the data transferred via P2P session 104a may include an instruction for the recipient mobile communications device 102c to establish its own connection with the processing server 112, such as via connection 106c, to communicate with the processing server 112 to complete the transfer of data.

However the data is transferred to the recipient device, in this example mobile communications device 102c, receipt of the information triggers a notification at the mobile communications device 102c. This may include a passive notification shown when the screen is locked at the mobile communications device 102c, and/or a light notification, or may be configured to display only when the user of the mobile communications device 102c next logs in beyond the locked screen. The notification may request the user of the mobile communications device 102c to accept or reject the data received from the mobile communications device 102a, for example a transfer of some monetary amount or an invoice. Upon acceptance or rejection, the recipient mobile communications device 102c may then transmit a status response to the initiating mobile communications device 102a identifying the acceptance or rejection. Further details will be discussed with respect to the figures below.

One exemplary embodiment of the mobile communications devices 102 is depicted in FIG. 2. In FIG. 2, the mobile communication devices 102 include a transceiver 202, a memory 204, a hardware processor 206, a user interface 208, a data store 210, a location determination system 212, and an image transaction system 214. These elements may be in direct or indirect communication with each other, for example via one or more buses.

The transceiver 202 may include a modem subsystem and a radio frequency (RF) unit and be configured to communicate bi-directionally with other devices, such as other mobile communications devices 102 and/or the network 108. The memory 204 may include a cache memory (e.g., a cache memory of the processor 206), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 204 includes a non-transitory computer-readable medium.

The memory 204 may store instructions that, when executed by the processor 206, cause the processor 206 to perform the operations described herein in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor 206 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein and discussed in more detail below. The processor 206 may also be implemented as a combination of computing devices, e.g., a combination of a DSP and a microprocessor, a plurality of microprocessors, one or more microprocessors in conjunction with a DSP core, or any other such configuration. The processor 206 may be a single processor or multiple processors, where each processor may have one or more processing cores capable of parallel and/or sequential operation.

The user interface 208 may include an input component and an output component. For example, the user interface 208 may include a touchscreen interface that outputs data for visual use as well as receives/processes one or more touches/swipes/gestures to be potentially interpreted according to embodiments of the present disclosure. Further, the user interface 208 may be used to display one or more notifications, elements of information, and application data according to embodiments of the present disclosure. The user interface 208 may also include one or more lights (e.g., LEDs) separate from a touchscreen, a vibration generator, a speaker, a microphone, input for a mouse, input for a keyboard, etc. useful for providing feedback to a user as well as receiving further input therefrom. The user interface may include one or more image capture devices, such as cameras capable of taking pictures and/or video and storing the images in the data store 210 and/or displaying the images live to a user of the mobile communications device 102.

The data store 210 may be, for example, a hard drive, flash drive, storage array, or other type of storage. The data store 210 may store notifications, transferred information, location information, map information, and/or update information (e.g., as an "app"). Further, in embodiments of the present disclosure, the data store 210 may store one or more contact lists that may contain identifying information for one or more contacts for a user of the mobile communications device 102, such as one or more addresses for the contact (e.g., email address, phone number, street address, etc.) and an image associated with the contact.

In an embodiment, the location determination system 212 may include one or more transceivers to enable communication with the GNSS 110 illustrated in FIG. 1. The mobile communications devices 102a, 102b, and 102c may further include assisted-GPS for enhanced signal acquisition/location quality. The location determination system 212 determines a location for the mobile communications device 102 based on the information obtained from the one or more transceivers in communication with the GNSS 110.

The image transaction system 214 may be an example of the app mentioned above with respect to the data store 210. In an embodiment, the image transaction system 214 is an application that communicates with the other components of the mobile communications device 102. For example, the image transaction system 214 may be in communication with the image capture device and/or other applications in use at the mobile communications device 102. For example, the image transaction system 214 may activate upon detection that the image capture device becomes active, or when an application is accessed that may be a source of one or more images used to initiate a transfer of data according to embodiments of the present disclosure (e.g., one or more social networking applications, one or more news applications, etc.).

Upon activation of the image transaction system 214, it may wait for one or more types of inputs to perform actions according to embodiments of the present disclosure. For example, in an embodiment, the image transaction system 214 may superimpose an identifying icon (e.g., unobtrusively such as in a corner of the screen and/or with some degree of transparency) over any images that appear on the touchscreen and then wait for user input. The user of the mobile communications device 214 may indicate a desire to use the image transaction system 214 to initiate transfers of data based on image recognition by selecting the region of the screen associated with the icon. Once selected, the image transaction system 214 monitors the next input from the touchscreen as a potential identification of a desired recipient.

The user may then select one or more regions of the touchscreen (e.g., by one or more taps with one or more fingers). The image transaction system 214 may then temporarily capture the information displayed on at least those portions of the touchscreen at the time of the selection. As noted with respect to FIG. 1, in some embodiments, the image transaction system 214 may perform pattern recognition on the information from the selection portion(s) of the touchscreen, such as in cooperation with the processor 206 or with a dedicated processor/controller of the image transaction system 214. In other embodiments, the image transaction system 214 may convey the information from the selected portion(s) of the touchscreen to the transceiver 202 for transmission to the processing server 112 of FIG. 1.

Alternatively, instead of an icon, the image transaction system 214 may recognize a particular gesture to indicate that an image should be captured for use in embodiments of the present disclosure (e.g., as opposed to merely capturing an image for storage and viewing later). For example, the image transaction system 214 may interpret a first gesture to mean a first type of data transfer, a second gesture to mean a second type of data transfer, etc. For example, tapping the touchscreen with some set of fingers (e.g., that are not generally recognized by the host operating system or application to correspond to some other function, like zoom), such as three, may indicate the first type of data transfer (such as a payment). Tapping with some different set of fingers, such as four, may indicate the second type of data transfer (such as an invoice). These are just a few examples; any number of gestures may be set for the image transaction system 214 to recognize as corresponding to any number of data transfer types. Other gestures may be possible as well, such as swipes in a pre-determined direction and/or with a predetermined number of fingers/touchpoints on the touchscreen, etc.

In embodiments where pattern recognition is performed locally at the mobile communications device 102, upon completion, the image transaction system 214 may take the recognized pattern(s) derived from the selected portion(s) (e.g., a different recognized pattern for each selected portion from the touchscreen—reference will be made herein to a recognized pattern generally for simplicity of discussion) and compare the recognized pattern to any stored patterns maintained at the mobile communications device 102, such as in the data store 210 (e.g., in one or more contact lists). A stored pattern may include and/or be based on an image of the corresponding contact (e.g., a person or a business, to name two examples of possible entities). Alternatively, the image transaction system 214 may have access to one or more social media accounts of the user of the mobile communications device 102, and may search through any connections in those account(s) in order to potentially locate a match based on profile information stored in those accounts. In other embodiments where pattern recognition is performed locally, the image transaction system 214 may instruct the transceiver 202 to transmit the recognized pattern to the processing server 112 for comparison to stored patterns there.

In embodiments where the image transaction system 214 performs the comparison at the mobile communications device 102, a result with a level of confidence of a match between the recognized pattern and stored pattern above a set level (e.g., 90% as one example) may be presented to the user for confirmation. Some or all of the matching contact's contact information may be presented via the touchscreen to the user of the mobile communications device 102 for confirmation before initiating transfer of the data. Alternatively, the image transaction system 214 may automatically initiate transfer of data (in some embodiments, the data may be confirmed by the user first while in others that may be pre-set as well and thus not receive further confirmation from the user) once a match is located, for example if the level of confidence is above a certain threshold (e.g., 98% as just one example), a type of data meets certain criteria (e.g., below a certain dollar amount, etc.), and/or the user of the mobile communications device 102 had set a preference for automatic initiation of a data transfer at a confidence threshold.

In some embodiments, the image transaction system 214 may obtain the location information from the location determination system 212 and use that information to assist in the comparison process. For example, a preference may be set, for example by the user, to use the location information to narrow the range of contacts whose stored patterns are compared against with the recognized pattern. In another embodiment, the image processing system 214 may use the location information to predict a type of data that the user desires to send by selecting image portions (e.g., a monetary amount when at a general geographic location, etc.).

In embodiments where the comparison is performed at the processing server 112, the location information may be sent to the processing server 112 with, or at a different time, information relating to the portion of the image (and/or the recognized pattern, where that is performed at the mobile communications device 102 and is used to compare against stored patterns at the processing server 112 and its potentially larger range of potential contacts). In an embodiment, the image transaction system 214 may have previously uploaded contact information from one or more contact information sources, such as local contact lists and/or social media relationships, to the processing server 112 in order to offload the searching burden to the processing server 112 and potentially further speed up the search/comparison process.

Once the processing server 112 completes the comparison process, the result may be sent back to the mobile communications device 102 so that the user may confirm the matching recipient and/or the data to be sent. In other embodiments where the processing server 112 performs the comparison, the data transfer may be initiated from the processing server 112 on behalf of the mobile communications device 102, with or without confirmation by the user of the mobile communications device 102. This may occur, for example, where the mobile communications device 102 sends the data to transfer (e.g., a dollar transfer amount from an account maintained at the processing server 112 for the user associated with the mobile communications device 102) with the recognized pattern (or information to undergo pattern recognition, where that is also done at the processing server 112) to the processing server 112.

Whether the match is located by the mobile communications device 102 or the processing server 112, in some embodiments the image transaction system 214 may direct a prompt to be displayed on the touchscreen requesting the user of the mobile communications device 102 to confirm the recipient. As security for the potential recipient may be a concern, for example where the match is located at the processing server 112 while searching through contact information that may not be otherwise accessible to the particular user of the mobile communications device 102, some portion of the recipient's name may be blocked so that the user does not obtain a full set of information of the recipient, but rather just some subset that may be sufficient enough to confirm whether the located identity is correct or not. Further, the image transaction system 214 may prompt the user of the mobile communications device 102 to confirm the data to be transferred, either at the same time as prompting the user to confirm the identity of the matching recipient or at a different time, such as after.

If a match is not located from the comparison, the image transaction system 214 may display a prompt to the user via the touchscreen indicating that no match was found. The prompt may request the user to add a new contact associated with the recognized pattern (e.g., including a name, one or more addresses such as street address, email address, telephone number, etc.) for storage either locally (e.g., in the data store 210) or on an external system such as the processing server 112 for later use. As one example, if the comparison is performed locally by the image transaction system 214, and no match is found when comparing against stored patterns locally, the image transaction system 214 may then forward the information on to the processing server 112 so that the processing server 112 may compare against stored patterns that it maintains, such as associated with the different users of one or more services offered by the processing server 112.

Turning now to FIG. 3, an exemplary processing server 112 is illustrated. The processing server 112 illustrated in FIG. 3 includes a transceiver 302, a memory 304, a hardware processor 306, a user interface 308, a data store 310, and an image transaction system 312. These elements may be in direct or indirect communication with each other, for example via one or more buses.

The transceiver 302 may include a modem subsystem and a radio frequency (RF) unit and be configured to communicate bi-directionally with the network 108. The memory 304 may include a cache memory (e.g., a cache memory of the processor 206), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store instructions that, when executed by the processor 306, cause the processor 306 to perform the operations described herein in connection with embodiments of the present disclosure. Instructions may also be referred to as code.

The processor 306 may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein. The processor 306 may also be implemented as a combination of computing devices, e.g., a combination of a DSP and a microprocessor, a plurality of microprocessors, one or more microprocessors in conjunction with a DSP core, or any other such configuration. The processor 306 may be a single processor or multiple processors, where each processor may have one or more processing cores capable of parallel and/or sequential operation.

The user interface 308 may include an input component and an output component. For example, the user interface 308 may include a screen interface that outputs data for visual use. The user interface 308 may also include input for a mouse, input for a keyboard, etc. useful for receiving further input therefrom.

The data store 310 may be, for example, a hard drive, flash drive, storage array, or other type of storage. The data store 310 may store a database used according to embodiments of the present disclosure. For example, the data store 310 may host a database that stores profile information for one or more users registered to use one or more services provided by the processing server 112. The profile information may include any one or more of name information for a subscribing user, address information associated with the subscribing user (e.g., street address, email address, phone number, etc.), payment information, an image associated with the subscribing user, and one or more preferences. In an embodiment, a preference may include whether or not the subscribing user has elected to allow aspects of its profile information (such as the image and a portion of the name) to be used in comparisons according to aspects of the present disclosure. The processing server 112 may further store patterns associated with a contact list of the mobile communications device 102 in the data store 310, such as in the same or a different database.

Further, the processing server 112 may use the profile information stored in one or more databases in the data store 310 to facilitate online transactions, such as payments and/or invoicing between parties (to name just a few examples). In additional or alternative embodiments, the processing server 112 may also have access to one or more databases maintained by a third party that may store additional profile information for the same or additional/different subscribing users.

The image transaction system 312 communicates with the other components of the processing server 112 to assist in various aspects of the present disclosure. For example, the image processing system 312 may perform pattern recognition on one or more contacts in a contact list. The mobile communications device 102 (referred to singularly but many mobile communications devices 102 may be corresponding with the processing server 112 at any given time) may have, at a previous time, sent its contact list (or a subset thereof) to the processing server 112 to assist in matching occurring more quickly. In that embodiment, the image transaction system 312 may store the patterns corresponding to the entries in the contact list locally, such as in an account in the database associated with the user of the mobile communications device 102. Alternatively, the processing server 112 may send the patterns back to the mobile communications device 102 for the mobile communications device 102 to store in its local data store 210 in association with the contacts in its contact list.

When a user of the mobile communications device 102 is attempting to initiate a transfer of data according to embodiments of the present disclosure, the image transaction system 312 may perform pattern recognition on the information from the selection portion(s) of the touchscreen when they are received from the mobile communications device 102, such as in cooperation with the processor 306 or with a dedicated processor/controller of the image transaction system 312. Once the image transaction system 312 has obtained a recognized pattern, the image transaction system 312 may send the recognized pattern back to the originating mobile communications device 102 for comparison against stored patterns there (e.g., in contact lists at the mobile communications device 102). Alternatively, the image transaction system 312 may itself compare the recognized pattern against at least a subset of stored patterns maintained in one or more databases for corresponding users, such as stored in data store 310.

Once a match is determined in embodiments where the processing server 112 performs the comparison, the image transaction system 312 may instruct the transceiver 302 to send some subset of profile information corresponding to the matched pattern to the originating mobile communications device 102. Confirmation of the match and/or of the data to transfer may be performed there according to some embodiments of the present disclosure. Alternatively, the image transaction system 312 may automatically initiate transfer of data once a match is located, for example if the level of confidence is above a certain threshold (e.g., 98% as just one example), a type of data meets certain criteria (e.g., below a certain dollar amount, etc.), and/or the user of the mobile communications device 102 had set a preference for automatic initiation of a data transfer at a confidence threshold in their profile for their account at the processing server 112.

Upon confirmation of a match, whether performed at the mobile communications device 102 or the processing server 112, initiation of a transfer of data occurs. For example, the mobile communications device 102 may send a message to the processing server 112 to initiate a transfer of data identified in the message to the recipient (e.g., identified with an address as determined from the pattern recognition/comparison/matching discussed above). The message may be received in conjunction with confirmation of the identified match being correct from the mobile communications device 102, such as where the comparison was performed by the image transaction system 312 at the processing server 112. Alternatively, the message may be received after confirmation has occurred (or, where confirmation is not required, after the match has been located whether at the mobile communications device 102 or the processing server 112).

The transfer of data may be performed directly between the mobile communications device 102 and the address of the recipient, which may for example be associated with another mobile communications device 102 (or any other communications device capable of receiving and transmitting information). In other embodiments, the transfer of data may use the processing server 112. For example, where the transfer of data is a payment or an invoice and the processing server 112 is a payment service provider, such as PayPal, Inc., of San Jose, Calif., the mobile communications device 102 may initiate the transfer of data by including, in the message, a request for the processing server 112 to perform the transfer between an account maintained at the processing server 112 for the user of the mobile communications device 102 and an account associated with the recipient.

For example, the account for the recipient may be an account also maintained by the processing server 112, in which case the image transaction system 312 may cause the transceiver 302 to send a notification message to the address for the recipient of the pending transfer of data. For example, the notification message may cause a mobile communications device 102 associated with the recipient to display a message to the recipient requesting the recipient to accept or decline the payment/invoice (continuing with this particular example). As another example, the recipient may maintain an account at another payment service provider/financial service provider. In that instance, the image transaction system 312 may cause the transceiver 302 to send, in addition to the notification message to the recipient, a message to the payment service provider that maintains the account for the recipient for the transfer of the data once the recipient has accepted/approved the transfer at their respective device.

Figure 4A:
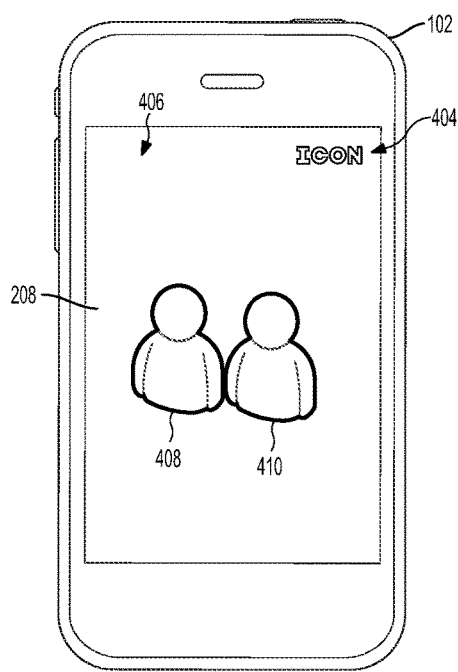
FIG. 4A is a block diagram of an exemplary mobile communications device according to embodiments of the present disclosure.

An example use case will now be described with reference to FIGS. 4A-6B. FIG. 4A is a block diagram of an exemplary mobile communications device 102 according to embodiments of the present disclosure, such as was discussed with respect to FIGS. 1 and 2 above.

FIG. 4A in particular illustrates an exemplary touchscreen of user interface 208. This will be referred to as touchscreen 208 here. Displayed on the touchscreen 208 is an image 406. The image 406 may be a live feed from a camera connected to (or integrated with) the mobile communications device 102, or may be a video stream from a video stored in the memory 204 and/or data store 210 or at some external system and streamed via the transceiver 202. The image 406 may alternatively be a photograph stored in a local gallery on the data store 210 and/or stored at some external system and sent to the mobile communications device 102, such as a social networking system.

As illustrated, the image 406 includes two entities 408 and 410. The entities 408 and 410 may be any combination of people, logos, or other text that have been captured by a camera in a live feed or static representation. For example, for purposes of illustration here, these will be described as the first entity 408 being a first person and the second entity 410 being a second person that fall within the view of the camera of the mobile communications device 102 or that have been captured in an image/video previously that is now being accessed on the mobile communications device 102.

As discussed above, certain gestures may be interpreted, for example by the image transaction system 214, as requests to perform different aspects of the present disclosure. For example, in an embodiment the image transaction system 214 may cause an icon 404 to be superimposed on the image 406. The icon 404 is illustrated as being located in the upper right corner of the image 406; this is exemplary. The icon 404 may be placed anywhere on the touchscreen 208 that may be associated with the image 406. The icon 404 may be fully opaque so that the region underneath it is not visible, or partially transparent so that it is less obtrusive to the user. In embodiments where specific gestures are set so that the image transaction system 214 recognizes specific functions to be performed, regardless of where on the screen the touch occurs, the icon 404 may be omitted. The following discussion will focus on the use of the icon 404, although it will be applicable to other types of gestures as will be recognized.

Figure 4B:
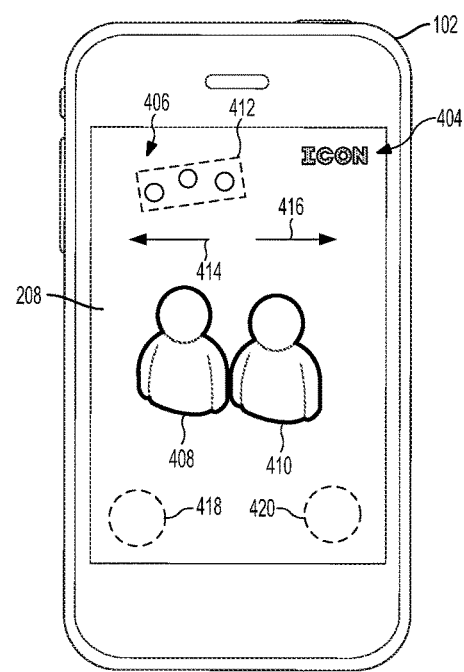
FIG. 4B is a block diagram of an exemplary mobile communications device according to embodiments of the present disclosure.

The region of the touchscreen 208 corresponding to where the icon 404 has been superimposed has been selected in FIG. 4B. As illustrated in FIG. 4B, once the area is selected for the icon 404, the icon 404 may change appearance (e.g., color and/or texture) to indicate that it has been selected by the user. For example, once the user selects (e.g., with touch or cursor) the region of the touchscreen 208 where the icon 404 is being superimposed, the image transaction system 214 may acknowledge the selection and cause the touchscreen 208 to change its appearance in response. With the icon 404 selected, the image transaction system 214 is active and ready to respond to any subsequent touch as an identification of a region on which to initiate pattern recognition.

Different gestures/touches/selections may correspond to different instructions. For example, a touch 412 with three fingertips (exemplary only; any number of touchpoints are envisioned within the scope of the present disclosure) may indicate a particular type of data transfer (e.g., in icon 404 embodiments, while in other embodiments it may trigger the image transaction system 214 to monitor the next input as a selection of a region for pattern recognition, and/or data transfer type). As another example, a gesture 414 may indicate a particular type of data transfer and gesture 416 another type of data transfer (e.g., in icon 404 embodiments, while in other embodiments, it may trigger the image transaction system 214 to monitor the next input as a selection of a region for pattern recognition, and/or data transfer type). For example, the swipe or gesture 414 may indicate that the user desires to send a payment to one or more entities to be selected subsequently, while the swipe or gesture 416 may indicate that the user desires to create and send an invoice to one or more entities selected subsequently.

As another example, touching regions 418 or 420 may indicate a particular type of data transfer (e.g., in icon 404 embodiments, while in other embodiments, it may trigger the image transaction system 214 to monitor the next input as a selection of a region for pattern recognition, and/or data transfer type). In addition or alternatively, selecting the regions 418 or 420 may indicate to the image transaction system 214 that all possible entities in the image 406 are to be selected, as will be discussed in more detail below.

Figure 5A:
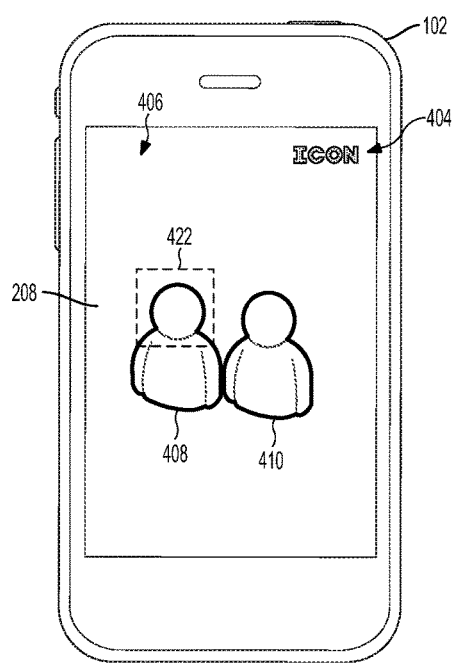
FIG. 5A is a block diagram of an exemplary mobile communications device according to embodiments of the present disclosure.

Turning now to FIG. 5A, after the icon 404 has been selected and, in some embodiments, a gesture used to indicate a type of data transfer the user desires to initiate, the user may identify one or more entities in the image 406 to obtain contact information for them to use in the data transfer. As illustrated, the icon 404 may retain its changed appearance during this portion of the procedure as well (and may continue to do so, for example, until the process is complete), thus providing the user a quick visual indicator of the input status of the mobile communications device 102.

As illustrated in FIG. 5A, the user has selected a single entity from the multiple available in the image 406, here entity/person 408. In an embodiment, the image transaction system 214 may cause the touchscreen 208 to superimpose a box 422 (e.g., a hollow box) identifying the region that the user selected. In an embodiment, the image transaction system 214 may provide a default-sized box (e.g., a certain distance in each direction from the directed touch point, with the box 422 being either rectangular or circular/oval in shape, to name some examples). The box 422 may be hollow but for the outline, so that the selected region is outlined by the box 422, or alternatively may be a partially transparent box, to name some examples.

Figure 5B:
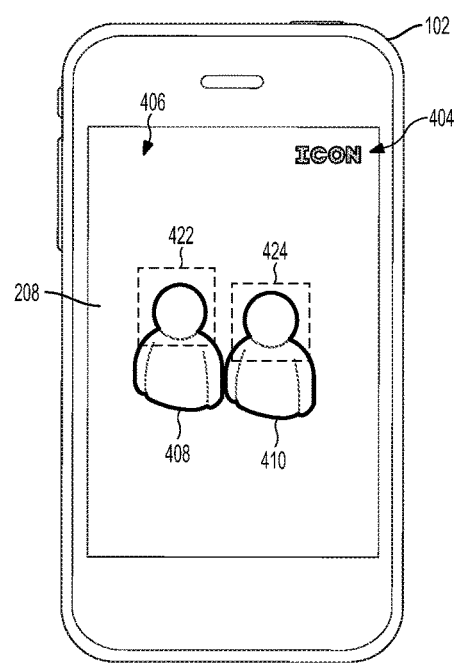
FIG. 5B is a block diagram of an exemplary mobile communications device according to embodiments of the present disclosure.

As illustrated in FIG. 5B, the user has selected multiple entities from those available in the image 406, here entity/person 408 and entity/person 410. As illustrated, the icon 404 may retain its changed appearance during this portion of the procedure as well (and may continue to do so, for example, until the process is complete), thus providing the user a quick visual indicator of the input status of the mobile communications device 102.

There are several ways in which both entities displayed in FIG. 5B may have been selected. For example, the user may have tapped the selected region for each selection individually. Alternatively, a "select all" feature may be provided for, for example via the regions 418 or 420, where those have been previously associated with a "select all" feature at the image transaction system 214. Doing so may trigger the image transaction system 214 to perform at least rudimentary pattern recognition on the image 406 to identify all faces (where those are of interest; other items of interest could include logos or other text, for example) in the image 406.

The image transaction system 214 may then provide an initial box over each face recognized in the image 406. The user may then manually modify the boxes displayed, for example by tapping regions of the image 406 where a box should be but has not appeared yet, or by tapping regions where a box has been placed but should not be. In addition to the box 422 already discussed with respect to FIG. 5A, the image transaction system 214 may additionally cause the touchscreen to superimpose a box 424 (e.g., a hollow box) identifying the selected region. In an embodiment, the image transaction system 214 may provide a default-sized box (e.g., a certain distance in each direction from the directed touch point, with the box 424 being either rectangular or circular/oval in shape, to name some examples). The box 424 may be hollow but for the outline, so that the selected region is outlined by the box 424, or alternatively may be a partially transparent box, to name some examples.

After the regions have been selected, pattern recognition of at least those selected regions is performed (e.g., either by the mobile communications device 102 or by the processing server 112) according to the embodiments discussed above. If a match is not found, the user may be prompted to enter in new contact information to associate the recognized pattern to a new contact (whether stored in a contact list at the mobile communications device 102, at the processing server 112, or both). If a match is found, confirmation of the match and/or type of data for transmission may then be confirmed.

Figure 6A:
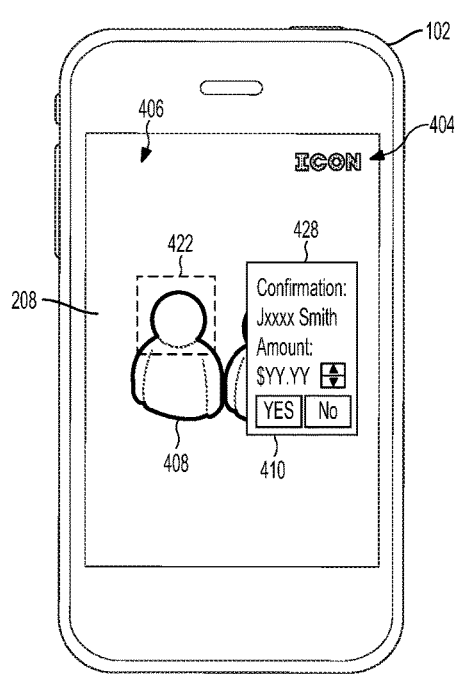
FIG. 6A is a block diagram of an exemplary mobile communications device according to embodiments of the present disclosure.

This is illustrated in FIG. 6A, where a single entity 408 has been selected as discussed above with respect to FIG. 5A, though the same procedure may be applied individually (e.g., with separate windows) or concurrently (e.g., together in the same window) when multiple entities are selected. In FIG. 6A, pattern recognition and comparison/matching have already completed. In the embodiment of FIG. 6A, a window 428 may be displayed on the touchscreen 208 to prompt the user to confirm the recipient identified and/or data for transfer (in this example, a payment).

As illustrated, the window 428 may include information about the recipient identified from the pattern matching procedure; here, the first letter and full last name are shown, thereby blocking out the full first name of the identified recipient. This may be used, for example, where the processing server 112 assisted in identifying the recipient based on a database that the user of the mobile communications device 102 does not have access to, thereby allowing the other users of the database/processing server 112 a measure of security from idle browsing.

The window 428 may also include a field that identifies the data to be transferred. In this example, the data to be transferred is a monetary amount. The image transaction system 214 may have a default data set to propose for sending, e.g. a default amount for payment, a default amount for invoicing, a default message to send, etc., depending upon the specific type of transfer the user previously specified near the start of the process. Alternatively, as noted above with respect to FIG. 2, in some embodiments of the present disclosure the image transaction system 214 may use location information obtained from the location determination system 212 to provide different default amounts, depending upon the location. As shown in window 428, the amount may also be manually increased or decreased by the user before the user selects "yes" or "no," corresponding to approval to complete the transfer and denial, respectively.

After the user has reviewed the information in the window 428 and selected "yes" (or something similar indicating approval to continue), the image transaction system 214 takes the yes input and initiates a transfer of the data. In an embodiment, this may be transferred via the transceiver 202 to a device associated with the address of the recipient, such as another mobile communications device 102, via a P2P connection. In embodiments where the transfer is a payment or an invoice, this may be considered an "offline" transfer. When the recipient mobile communications device 102 receives the message containing the transferred data, the message will also include a trigger for the recipient mobile communications device 102 to establish its own connection to the processing server 112 in order to complete the transaction. In other embodiments where the processing server 112 is involved, the originating mobile communications device 102 may initiate transfer of the data by sending a message to the processing server 112, e.g., the payment information and/or invoice information as a few examples.

Once the processing server 112 receives the message, it causes the processing server 112 to take the address of the recipient identified in the message, initiate the transfer identified in the message (e.g., payment or invoice), and send a notification message to the recipient mobile communications device 102 of the pending transaction for approval/denial/modification. As part of this process, the processing server 112 may identify the account associated with the user of the originating mobile communications device 102 (e.g., which identifying information for the account may be included in the message) and the account associated with the recipient. If the recipient does not already have an account with the operator of the processing server 112, the processing server 112 may either identify where the recipient may have an account (e.g., another financial institution, etc.) to facilitate transfer of the payment to where the recipient has an account, or may include in its notification message to the recipient's mobile communications device 102 a prompt to open an account at the processing server 112.

The notification message, whether received from the processing server 112 or the originating mobile communications device 102, triggers the recipient mobile communications device to display a notification of receipt of the message, e.g., a window on the screen, flashing of an LED light, etc. The notification may include a prompt to accept or decline the data transfer, and in some embodiments modify it (e.g., for a monetary amount, modify to a reduced amount or increased amount, which may trigger the processing server 112 to relay a message back to the originating mobile communications device 102 to accept or decline the modification).

Back at the originating mobile communications device 102, once the data transfer has been approved, the icon 404 may return to its initial state. Any touches to the touchscreen 208 thereafter, except on the region of the icon 404, may be responded to according to any other system operations as set in the mobile communications device 102. For example, the user may finish its use of the camera or viewing of images (e.g., in an image gallery or social media account) and shift to other screens.

Figure 6B:
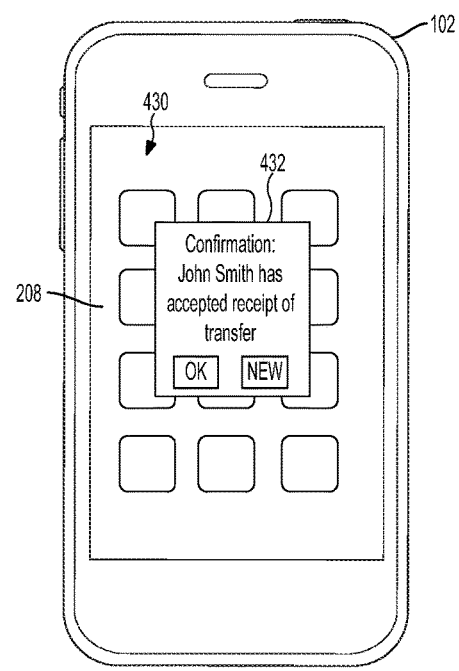
FIG. 6B is a block diagram of an exemplary mobile communications device according to embodiments of the present disclosure.

For example, as illustrated in FIG. 6B, the user may have navigated to a home screen 430 before the recipient acts on the notification message it received. Once the recipient accepts or declines the data contents of the data transfer, this may be relayed back to the originating mobile communications device 102 via the processing server 112 or sent via another path (e.g., a P2P connection). This decision message, once received at the originating mobile communications device 102, triggers the mobile communications device 102 to display the result. In the illustrated example, a window 432 indicates that the data transfer was accepted. If the recipient accepts the transfer, the security concern may be reduced and therefore the confirmation message may include the full name of the recipient. Although illustrated as a window, the window 432 may alternatively be another type of notification, such as a particular sound and/or light depending on whether the transfer was accepted or declined, or a notification identifier in a corner of the touchscreen 208, etc.

The user of the mobile communications device 102 may accept the notification and return to whatever operation (if any) the user was engaged in before the notification (by selecting "OK" in the illustrated example of FIG. 6B). Alternatively, the user may select to initiate another data transfer by selecting "new" in the illustrated example. If this is selected, it may trigger the mobile communications device 102 to open up the application that controls a camera of the mobile communications device 102 (or an image gallery, or a social network, etc.) so that another image (whether a new one or the same one as before) may be accessed to select one or more other regions to perform aspects of the present disclosure.

Thus, embodiments of the present disclosure enable a user of a mobile communications device 102 to initiate data transfers in a more automated manner using images to identify the contacts for the message transferring the data. For example, the user may be at a gathering of people (e.g., a family reunion, a party, etc.) with multiple people in attendance. Several of those in attendance may decide to take a group photograph. The user may realize that he/she owes $20 to one of those that were in the photograph (or frame of the camera before or after photograph is taken). On the photograph or frame, the user may tap on or otherwise select the face of the targeted recipient (or, in some embodiments, nearby the face of the targeted recipient). The mobile communications device 102 of the user, or the processing server 112, performs pattern recognition and comparison to other patterns to find a match. The processing server 112 may set up a payment flow to facilitate transfer of the $20 from the user to the selected recipient.

As another example, a group of people may be gathered together at an event in which each of the people had agreed to contribute to cover the cost of the event. The person who assumed the initial cost of the event may take a picture of the group, select all of the members of the group that agreed to contribute, and indicate that an invoice should be generated. The processing server 112 may then generate the invoice and communicate it to all those that were identified from the group picture. Further, someone who later reviews the group picture, for example after it is posted on a social networking site, may desire to transfer additional money to the person who assumed the initial cost of the event. They may therefore select a region of the group picture of the person and initiate a payment as noted above.

As another example, a group of people may come together at a restaurant. When it comes time to pay the bill, the people in the group may use embodiments of the present disclosure to split the bill and/or reimburse each other. For example, one person may pay the full bill and take one or more photographs of the group and initiate invoicing as discussed above. Alternatively, each member may capture an image of the person paying the full bill and initiate a transfer of their share of the bill to that person. As another alternative, when it comes time to pay the bill, each person in the group may capture an image relating to the restaurant, such as the logo of the restaurant, or a particular image generated for the check for the group, and initiate a transfer of a fraction of the bill to one or more accounts associated with the restaurant itself. Tipping may be handled in a similar manner.

These are just a few particular examples of how embodiments of the present disclosure may be applied and are not intended to be limiting.

Figure 7:
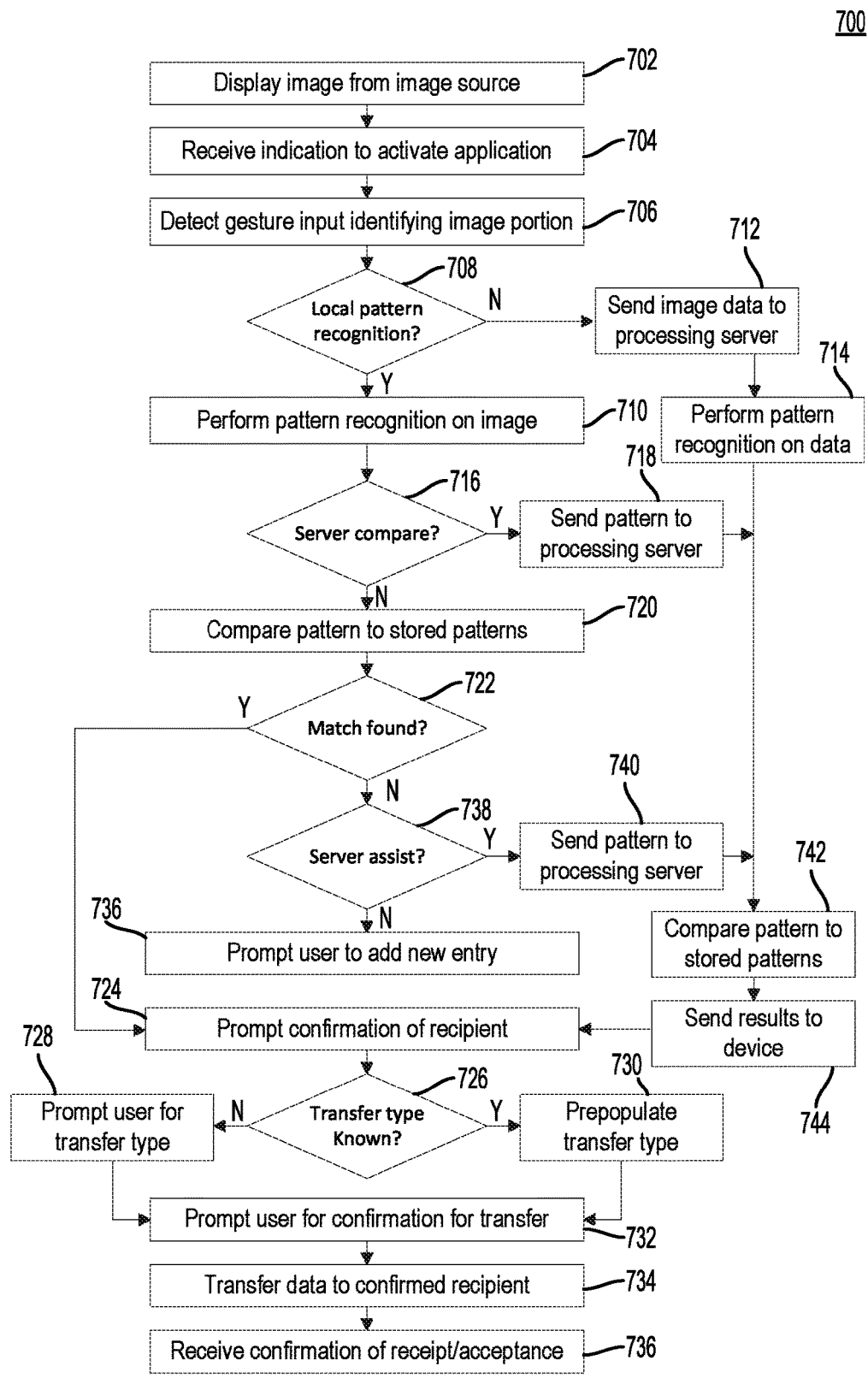
FIG. 7 is a flow diagram illustrating an embodiment of a method for enhanced image-based information exchange according to an embodiment of the present disclosure.

Turning now to FIG. 7, a flow diagram illustrates a method 700 for enhanced image-based information exchange according to an embodiment of the present disclosure. The method 700 will be described with respect to a mobile communications device 102 for simplicity of discussion, though it will be recognized that the aspects described herein may be applicable to a plurality of mobile communications devices 102. It is understood that additional steps can be provided before, during, and after the steps of method 700, and that some of the steps described can be replaced or eliminated for other embodiments of the method 700.

At block 702, the mobile communications device 102 displays an image on the touchscreen 208 from an image source. The image source may be an image capturing device associated with the mobile communications device 102 providing a live feed, or storage of the mobile communications device providing a picture/video collected previously by the image capturing device. The image source may also be an external source, such as a social networking site or other website, to name a few examples.

At block 704, the mobile communications device 102 receives an indication to activate the image transaction system 214. This may come in the form of a pre-specified gesture (e.g., a specified number of touchpoints and/or gesture direction(s)) on the touchscreen 208 or of a touch in the region of a dedicated icon superimposed on the image.

At block 706, the mobile communications device 102 detects a gesture input identifying at least one portion of the image to process in order to identify a recipient and initiate a transfer of data according to embodiments of the present disclosure. There may be one or multiple such gesture inputs corresponding to one or multiple entities that the user of the mobile communications device 102 desires to identify as recipients.

At decision block 708, if the mobile communications device 102 performs pattern recognition, then the method 700 proceeds to block 710. At block 710, the mobile communications device 102 performs pattern recognition on the one or more selected regions of the image.

Returning to decision block 708, if the mobile communications device 102 does not perform pattern recognition, then the method 700 proceeds to block 712. At block 712, the mobile communications device 102 sends image data including at least the selected regions of the image to a processing server 112. At block 714, the processing server 112 performs pattern recognition on the one or more selected regions of the image as received from the mobile communications device 102 at block 712.

Turning now to decision block 716, if the processing server 112 is the entity designated to compare the recognized pattern to one or more stored patterns associated with contacts, then the method 700 proceeds to block 718. At block 718, the mobile communications device 102 sends the recognized pattern to the processing server 112.

Returning to decision block 716, if instead the mobile communications device 102 compares the recognized pattern to one or more stored patterns, then the method 700 proceeds to block 720.

At block 720, the mobile communications device 102 compares the recognized pattern against one or more stored patterns. For example, the mobile communications device 102 may have stored patterns corresponding to one or more images for contacts in one or more contact lists previously created, against which the recognized pattern is compared. Alternatively or in addition, the mobile communications device 102 may have access to patterns associated with profiles in one or more social networking sites against which to compare the recognized pattern.

At decision block 722, if a match has been located, then the method 700 proceeds to block 724. A match may result from the recognized pattern and the matching pattern meeting matching requirements for a given pattern recognition algorithm (e.g., any known or future algorithm for recognizing patterns and matching patterns may be used without departing from the scope of the present disclosure, such as extracting and comparing landmarks, contour matching, curve fitting, using probability measures, decision theory, neural networks, kernel approaches, clustering, inferences, some combination of different approaches, etc.).

At block 724, the mobile communications device 102 prompts the user to confirm the identity of the recipient that corresponds to the matching stored pattern, for example via a window prompt on the touchscreen 208 of the mobile communications device 102.

At decision block 726, if the type of transfer is not known already (e.g., a payment, an invoice, etc.), then the method 700 proceeds to block 728. At block 728, the mobile communications device 102 prompts the user, for example via a window prompt on the touchscreen 208, to identify the data transfer type (whether by selecting from a drop-down menu or manually entering the type, or by a pre-determined gesture, etc.).

Returning to decision block 726, if the type of transfer is known already, then the method 700 proceeds to block 730. This may occur, for example, where the image transaction system 214 detected a gesture pre-determined to identify a transaction type at an earlier stage in the process. At block 730, the mobile communications device 102 may prepopulate the transfer type (e.g., payment, invoice, etc.), and/or the details of the transfer (e.g., a monetary amount, etc.).

From either block 728 or block 730, the method 700 proceeds to block 732. At block 732, the mobile communications device 102 prompts the user to confirm the transfer, including the details of the transfer including the type and details. If the information is incorrect, the user has an option in the prompt to modify the details of the transfer or the transfer type.

At block 734, the mobile communications device 102 initiates transfer of the data to the confirmed recipient from block 724. This may involve transmitting the data to a device associated with the determined address of the recipient directly or indirectly, or by instructing the processing server 112 to facilitate the transfer (e.g., where monetary amounts may change accounts).

At block 736, the mobile communications device 102 receives a confirmation from the recipient's device (whether directly/indirectly via P2P, Internet, etc. or facilitated by the processing server 112). The confirmation may confirm that the data transfer was received and/or that the data transfer was accepted at the recipient's device.

Returning now to decision block 722, if a match was not located after the comparison at block 720, then the method 700 proceeds to decision block 738.

At decision block 738, if the processing server 112 also assists in searching for a match after a failure to locate a match locally, then the method 700 proceeds to block 740. At block 740, the mobile communications device 102 sends the recognized pattern to the processing server 112.

At block 742, which method 700 reaches from either block 714 or block 740, the processing server 112 compares the recognized pattern to one or more stored patterns associated with one or more databases at the processing server 112 or accessible by the processing server 112.

At block 744, the processing server 112 sends the results of its comparison to the mobile communications device 102. This may include the result of not being able to locate a match (e.g., with a sufficient confidence level), in which case the method 700 may proceed to block 736. If a match is found and sent as the result, then the method 700 may proceed to block 724 and proceed as discussed above.

Figure 8:
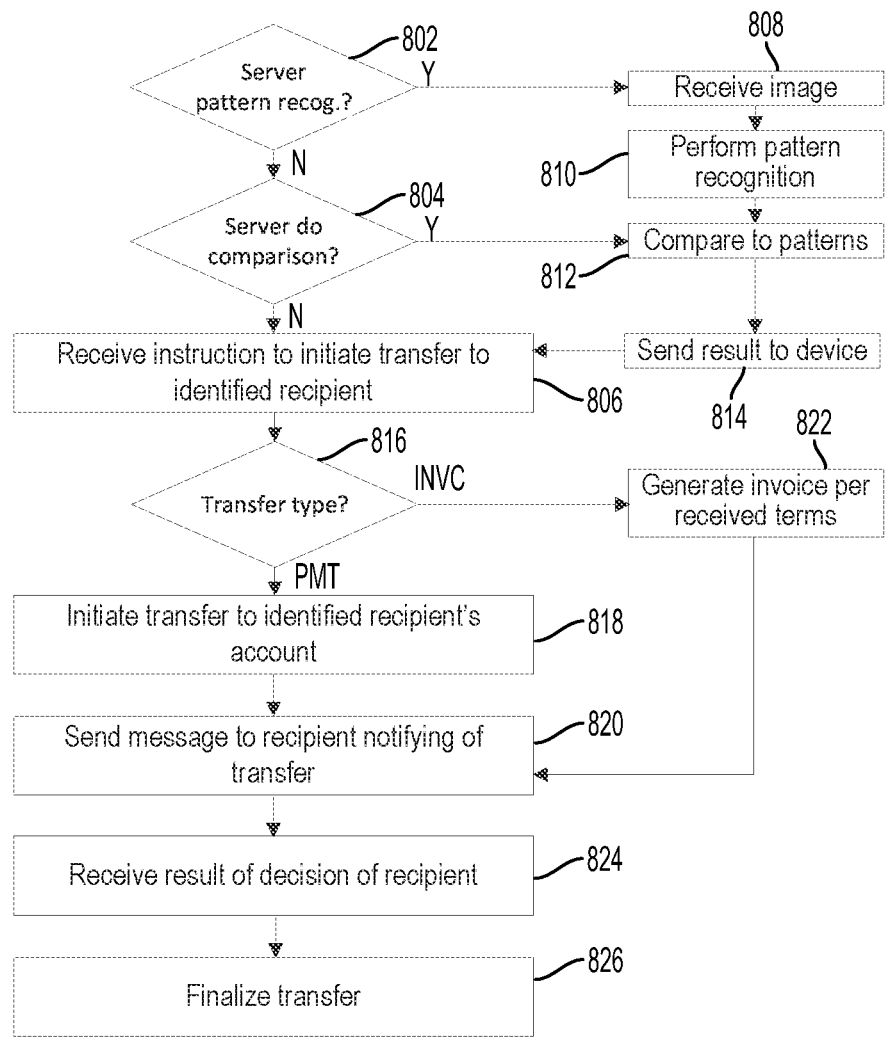
FIG. 8 is a flow diagram illustrating an embodiment of a method for enhanced image-based information exchange according to an embodiment of the present disclosure.

Turning now to FIG. 8, a flow diagram illustrates a method 800 for enhanced image-based information exchange according to an embodiment of the present disclosure. The method 800 will be described with respect to a processing server 112 and a singular originating mobile communications device 102 for simplicity of discussion, though it will be recognized that the aspects described herein may be applicable to any number of mobile communications devices 102. It is understood that additional steps can be provided before, during, and after the steps of method 800, and that some of the steps described can be replaced or eliminated for other embodiments of the method 800.

At decision block 802, if the processing server 112 does not perform pattern recognition for at least selected portions of images (e.g., the mobile communications device 102 does instead), then the method 800 proceeds to decision block 804.

At decision block 804, if the processing server 112 does not perform comparisons of recognized patterns to stored patterns for the mobile communications device 102, then the method 800 proceeds to block 806.

At block 806, the processing server 112 receives instruction to initiate a data transfer to an identified recipient. This may occur, for example, where a recognized pattern has been obtained and a matching pattern has been found to the recognized pattern. Further, this may occur where the mobile communications device 102 does not transfer the data via some other mechanism such as P2P or a cellular network (but, even in that situation, the processing server 112 may receive a message from the recipient requesting that a payment occur where that is at issue).

Returning to decision block 802, if the processing server 112 does perform pattern recognition for selected portions of images, then the method 800 proceeds to block 808. At block 808, the processing server 112 receives at least a portion of one or more images (e.g., together or sequentially) from the mobile communications device 102.

At block 810, the processing server 112 performs pattern recognition on the one or more selected regions of the image as received from the mobile communications device 102 at block 808.

At block 812, the processing server 112 compares the recognized pattern from block 810 to one or more stored patterns associated with one or more databases at the processing server 112 or accessible by the processing server 112.

Returning to decision block 804, if the processing server does perform comparisons of recognized patterns to stored patterns, then the method 800 proceeds to block 812.

From block 812, the method 800 proceeds to block 814. At block 814, the processing server 112 sends the results of its comparison to the mobile communications device 102, for example as described with respect to block 744 of FIG. 7. From block 814, the method 800 proceeds to block 806 as discussed above.

From block 806, the method 800 proceeds to decision block 816. At decision block 816, if the transfer type is a payment, then the method 800 proceeds to block 818. If the transfer type is an invoice, then the method 800 proceeds to block 822. These are just two examples of what the transfer type may be.

At block 818, the processing server 112 initiates a transfer of the monetary amount from the user's account (of originating mobile communications device 102) to the recipient's account, whether the accounts are both maintained at the processing server 112 or at separate processing/financial institutions (for this particular example).

At block 820, the processing server 112 sends a notification message to the mobile communications device 102 associated with the recipient (and/or other devices). For example, the notification message may cause the mobile communications device 102 associated with the recipient to display a message to the recipient requesting the recipient to accept or decline the payment/invoice (continuing with this particular example). As another example, the recipient may maintain an account at another payment service provider/financial service provider. In that instance, the processing server 112 may send, in addition to the notification message to the recipient's device, a message to the payment service provider that maintains the account for the recipient for the transfer of the data once the recipient has accepted/approved the transfer at their respective device.

Returning to decision block 816, if the transfer type is an invoice, then the method 800 proceeds to block 822. At block 822, the processing server 112 generates an invoice according to the terms received from the originating mobile communications device 102. The method 800 proceeds from block 822 to block 820, where the notification is sent to the recipient.

Whether payment or invoice, the method 800 proceeds from block 820 to block 824. At block 824, the processing server 112 receives a result of the decision of the recipient. For example, where the transfer was of a payment, the recipient may have indicated either that the payment was accepted or declined. As another example, where the transfer was an invoice, the recipient may have indicated acceptance/authorization to pay the invoice or a dispute of the invoice.

At block 826, the processing server 112 finalizes the transfer based on the result of block 824. For example, where the recipient accepted a payment as the transfer, then the processing server 112 may finalize the transfer from the user of the originating mobile communications device 102's account to the recipient's account (whether at the processing server 112 or at a third-party processing/financial server). As another example, if the transfer was an invoice, the processing server 112 may transfer the invoiced amount where the invoice is authorized by the recipient, so that the amount is transferred from the recipient's account to the user's account.

In addition (whether payment or invoice), the processing server 112 may forward on a status message to the originating mobile communications device 102, such as that the recipient accepted or declined the data transfer. In some embodiments, the recipient may send the status message to the originating mobile communications device 102 independent of the processing server 112.

Figure 9:
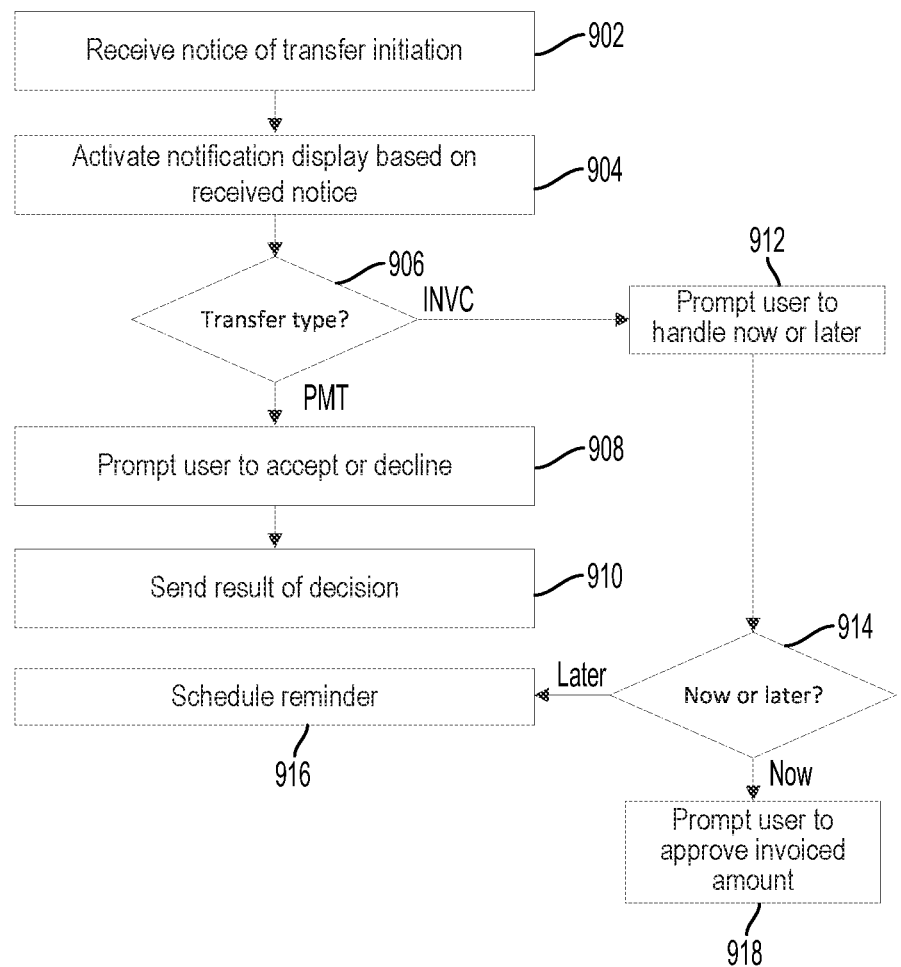
FIG. 9 is a flow diagram illustrating an embodiment of a method for enhanced image-based information exchange according to an embodiment of the present disclosure.

Turning now to FIG. 9, a flow diagram illustrates a method 900 for enhanced image-based information exchange according to an embodiment of the present disclosure. The method 900 will be described with respect to a mobile communications device 102 (referred to here as a recipient mobile communications device 102 associated with a recipient identified according to embodiments of the present disclosure) for simplicity of discussion, though it will be recognized that the aspects described herein may be applicable to any number of mobile communications devices 102. It is understood that additional steps can be provided before, during, and after the steps of method 900, and that some of the steps described can be replaced or eliminated for other embodiments of the method 900.

At block 902, the recipient mobile communications device 102 receives a notification message of a transfer initiation. For example, the notice may be from a processing server 112 on behalf of an originating mobile communications device 102, or from the originating mobile communications device 102 via a different path than the processing server 112. As discussed above, this notification message arrives in response to the user of the originating mobile communications device 102 selecting a portion of an image, processing that image for pattern recognition, comparing the recognized pattern against stored patterns (at the originating mobile communications device 102 or the processing server 112) and identifying an address of a recipient corresponding to a matched stored pattern.

At block 904, a notification display is activated at the recipient mobile communications device 102 in response to receipt of the notification message at block 902. This notification display may include a passive notification shown when the screen is locked at the recipient mobile communications device 102, and/or a light notification, or may be configured to display only when a user of the recipient mobile communications device 102 next logs in beyond the locked screen. The notification may include a prompt to accept or decline the data transfer.

At decision block 906, if the transfer type is a payment, then the method 900 proceeds to block 908. At block 908, the recipient mobile communications device 102 prompts the user of the device (e.g., the intended recipient whose address was identified according to embodiments of the present disclosure) to accept or decline the payment. This may be activated in response to the receipt of the notification message at block 902, and may be done separately from or at the same time as the notification display at block 904.

At block 910, the recipient mobile communications device 102 receives the user's input in response to the prompt at block 908 and sends the response back to the device that triggered the notification. In an embodiment, that may be the processing server 112 on behalf of the originating mobile communications device 102, while in another embodiment that may be the originating mobile communications device 102 (bypassing the processing server 112), or a combination of the two.

Returning to decision block 906, if the transfer type is an invoice, then the method 900 proceeds to block 912. At block 912, the recipient mobile communications device 102 prompts the user to process/respond to the invoice at the present time or a subsequent time.

At decision block 914, if the user selected to process/respond to the invoice at a subsequent time, then the method 900 proceeds to block 916. At block 916, the recipient mobile communications device 102 schedules a follow-up reminder to again display a notification to the user of the invoice. This scheduled reminder may be sent back to the processing server 112 as well, so that it may make note and send a reminder as well.

If, at decision block 914, the user instead selected to process/respond to the invoice at the present time, then the method 900 proceeds to block 918. At block 918, the recipient mobile communications device 102 prompts the user to approve or decline the invoiced amount. If the user approves the invoiced amount, the approval message is sent back to the processing server 112, whereupon the payment is processed such as discussed with respect to block 826.

If the user declines the invoice, or disputes the amount or some other aspect of the invoice, the message back to the processing server 112 may the dispute, and/or a modified amount, which may be relayed back to the originating mobile communications device 102 for decision/further dispute. In an embodiment, the processing server 112 may be configured so that, if the disputed amount is within some percentage threshold of the original amount, the processing server 112 may automatically accept the change and finalize the transaction.

Figure 10:
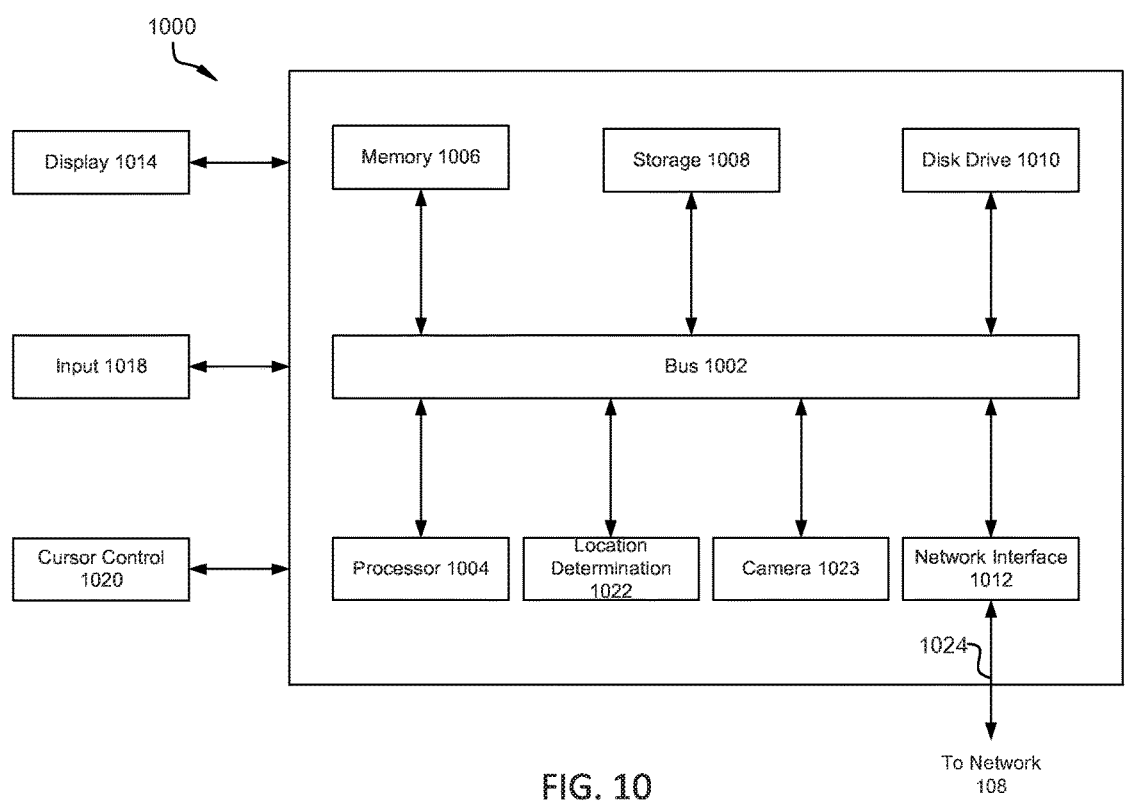
FIG. 10 is a schematic view illustrating an embodiment of a computing system.

Referring now to FIG. 10 an embodiment of a computer system 1000 suitable for implementing, for example, the mobile communications devices, mobile devices, servers, etc., is illustrated. It should be appreciated that other devices utilized by users, payment service providers, point of sale operators, and/or merchants/stores in the system discussed above may be implemented as the computer system 1000 in a manner as follows.

In accordance with various embodiments of the present disclosure, computer system 1000, such as a mobile device, computer and/or a server, includes a bus 1002 or other communication mechanism for communicating information, which interconnects subsystems and components, such as a processing component 1004 (e.g., a hardware processor, micro-controller, digital signal processor (DSP), etc.), a system memory component 1006 (e.g., RAM), a static storage component 1008 (e.g., ROM), a disk drive component 1010 (e.g., magnetic or optical), a network interface component 1012 (e.g., modem or Ethernet card), a display component 1014 (e.g., CRT or LCD), an input component 1018 (e.g., keyboard, keypad, or virtual keyboard), a cursor control component 1020 (e.g., mouse, pointer, or trackball), a location determination component 1022 (e.g., a Global Positioning System (GPS) device as illustrated, a cell tower triangulation device, and/or a variety of other location determination devices known in the art), and/or a camera component 1023. In one implementation, the disk drive component 1010 may comprise a database having one or more disk drive components.

In accordance with embodiments of the present disclosure, the computer system 1000 performs specific operations by the processor 1004 executing one or more sequences of instructions contained in the memory component 1006, such as described herein with respect to the mobile communications devices, mobile devices, and/or servers. Such instructions may be read into the system memory component 1006 from another computer readable medium, such as the static storage component 1008 or the disk drive component 1010. In other embodiments, hard-wired circuitry may be used in place of or in combination with software instructions to implement the present disclosure.

Logic may be encoded in a computer readable medium, which may refer to any medium that participates in providing instructions to the processor 1004 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1010, volatile media includes dynamic memory, such as the system memory component 1006, and transmission media includes coaxial cables, copper wire, and fiber optics, including wires that comprise the bus 1002. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1000. In various other embodiments of the present disclosure, a plurality of the computer systems 1000 coupled by a communication link 1024 to the network 108 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1000 may transmit and receive messages, data, information and instructions, including one or more programs (i.e., application code) through the communication link 1024 and the network interface component 1012. The network interface component 1012 may include an antenna, either separate or integrated, to enable transmission and reception via the communication link 1024. Received program code may be executed by processor 1004 as received and/or stored in disk drive component 1010 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory storing instructions;
   a display configured to display information comprising an image to a user of the system; and
   one or more hardware processors coupled to the non-transitory memory and configured to read the instructions from the non-transitory memory to cause the system to perform operations comprising:
   receiving a selection of a portion of the image from the user;
   determining a first pattern from the selected portion of the image;
   in response to determining that the first pattern corresponds to one or more stored patterns of a plurality of stored patterns:
   determining a confidence level associated with the correspondence between the first pattern and the one or more stored patterns; and
   identifying contact information of a recipient associated with the one or more stored patterns; and
   in response to determining that the confidence level is above a first threshold level and a monetary amount associated with data to be transmitted being below a second threshold level, automatically initiating a transmission of the data to the recipient based on the identified contact information.

2. The system of claim 1, wherein the operations further comprise:
   performing pattern recognition on the selected portion of the image to obtain the first pattern; and
   prompting the user to confirm the recipient as a target for the data prior to initiating the transmission in response to the confidence level indicating there is no match.

3. The system of claim 1, further comprising:
   a location determination device configured to determine a location of the system, the operations further comprising narrowing the plurality of stored patterns to a subset of stored patterns based on the determined location of the system.

4. The system of claim 1, wherein the operations further comprise:
   as part of the selection of the portion of the image, detecting a gesture from the user on the display;
   determining whether the gesture is a first gesture type comprising a first number of approximately simultaneous gesture inputs that corresponds to a first composition of data, or a second gesture type comprising a second number of approximately simultaneous gesture inputs that corresponds to a second composition of data, the first and second compositions of data being different from each other and the second number of inputs being different from the first number of inputs; and
   in response to the gesture type comprising the first gesture type, using the first composition of data as the data.

5. The system of claim 1, wherein:
   the selected portion of the image comprises a plurality of portions corresponding to a plurality of entities in the image,
   the determining comprises determining a plurality of patterns for each of the plurality of portions,
   the identifying comprises identifying contact information for a plurality of recipients associated with the plurality of patterns, and
   the initiating comprises initiating the transmission to the plurality of recipients based on the identified contact information for the plurality of recipients.

6. A non-transitory machine-readable medium having stored thereon machine-readable instructions executable to cause a machine to perform operations comprising:
   receiving a selection of a portion of an image displayed on a screen of the machine by a user;
   transmitting the selected portion of the image to a processing server, wherein the transmitting the image to the processing server triggers the processing server to determine a recognized pattern from the selected portion of the image and to determine a correspondence between the recognized pattern and one or more patterns;
   receiving, from the processing server, a message identifying the correspondence between the recognized pattern and the one or more patterns;
   in response to the message identifying the correspondence, determining a confidence level associated with the correspondence; and
   in response to determining that the confidence level is above a first threshold level and a monetary amount associated with data to be transmitted being below a second threshold level, automatically initiating a transmission of the data to a recipient identified by contact information associated with the one or more patterns.

7. The non-transitory machine-readable medium of claim 6, wherein the operations further comprise:
   prompting the user to add a new entry to a contact information list in response to the confidence level indicating there is no match.

8. The non-transitory machine-readable medium of claim 6, wherein the operations further comprise:
   determining, by a location determination device of the machine, a location of the machine;
   selecting an item of information to transmit as the data from among a plurality of items based on the determined location of the machine; and
   in response to the selecting based on the determined location, prompting the user to confirm or edit the item of information before initiating the transmission.

9. The non-transitory machine-readable medium of claim 6, wherein the operations further comprise:
   providing, by an image detection device of the machine, a live stream of images to the screen for the selection by the user.

10. The non-transitory machine-readable medium of claim 6, wherein the operations further comprise:
    displaying a static image on the screen for the selection by the user.

11. The non-transitory machine-readable medium of claim 6, wherein the data comprises at least one of:

a monetary amount in payment; or an invoice identifying a monetary amount for the recipient to pay.

12. A method, comprising:

receiving a selection of a portion of an image displayed on a screen of a mobile communications device;

performing pattern recognition on the selected portion of the image to obtain a recognized pattern;

determining that the recognized pattern corresponds to one or more stored patterns of a plurality of stored patterns at the mobile communications device;

determining a confidence level associated with the correspondence of the recognized pattern to the one or more stored patterns;

determining the confidence level is above a first threshold level and a monetary amount associated with data to be transmitted is below a second threshold level; and automatically initiating a transmission of the data to a recipient identified by contact information associated with the one or more patterns.

13. The method of claim 12, further comprising:

transmitting the recognized pattern to a processing server in response to determining there is not a correspondence between the recognized pattern and the one or more stored patterns at the mobile communications device, wherein the transmitting the image to the processing server triggers the processing server to compare the recognized pattern to one or more patterns at the processing server to determine if there is a correspondence; and receiving, from the processing server, a message identifying a corresponding pattern as a stored pattern from among the one or more patterns at the processing server.

14. The method of claim 13, further comprising:

prompting a user to add a new entry to a contact information list in response to the confidence level indicating there is no match.

15. The method of claim 12, further comprising:

determining, by a location determination device of the mobile communications device, a location of the mobile communications device;

narrowing, by the mobile communications device, the one or more stored patterns to a subset of stored patterns based on the determined location; and selecting, by the mobile communications device, an item of information to transmit as the data from among a plurality of items based on the determined location of the mobile communications device.

16. The method of claim 12, further comprising:

establishing the first threshold level, corresponding to a less than 100 percent value below which a user will be prompted to confirm a result, and above which the transmission of the data will be automatically initiated in response to the monetary amount being less than the second threshold level; and prompting, in response to the confidence level being below the first threshold level, the user to confirm the result.

17. The system of claim 1, wherein the operations further comprise:

determining a second pattern from a new selected portion;

in response to determining that the second pattern corresponds to another one or more stored patterns of the plurality of stored patterns, determining a second confidence level associated with the correspondence; and in response to the second confidence level being below the first threshold level that corresponds to a less than 100 percent value, prompting the user to confirm a result.

18. The non-transitory machine-readable medium of claim 6, wherein the operations further comprise:

determining a second pattern from a new selected portion;

in response to determining that the second pattern corresponds to another one or more patterns of a plurality of stored patterns, determining a second confidence level associated with the correspondence; and in response to the second confidence level being below the first threshold level that corresponds to a less than 100 percent value, prompting the user to confirm a result.

19. The method of claim 12, further comprising:

as part of the selection of the portion of the image, detecting a gesture from a user on a region of the screen;

in response to the gesture on the region of the screen being on a first region of the screen, using a first composition of data as the data; and in response to the gesture on the region of the screen being on a second region of the screen, using a second composition of data as the data, wherein the first region and the second region are located at different portions of the screen, and the first composition of data is different from the second composition of data.

* * * * *